United States Patent [19]
Senoo

[11] Patent Number: 5,251,257
[45] Date of Patent: Oct. 5, 1993

[54] 2-WIRE/3-WIRE CONVERTING APPARATUS

[75] Inventor: Seiiti Senoo, Shiki, Japan

[73] Assignee: Sharp Kabushiki Kaisha, Osaka, Japan

[21] Appl. No.: 756,184

[22] Filed: Sep. 9, 1991

[30] Foreign Application Priority Data

Sep. 12, 1990 [JP] Japan ................... 2-243095
Sep. 12, 1990 [JP] Japan ................... 2-243096

[51] Int. Cl.$^5$ ........................ H04M 1/00; H04M 3/00
[52] U.S. Cl. ........................ 379/399; 379/402; 379/413; 379/345
[58] Field of Search ............... 379/58, 345, 402, 399, 379/405, 413, 59

[56] References Cited

U.S. PATENT DOCUMENTS

| | | | |
|---|---|---|---|
| 4,554,416 | 11/1985 | Pacini et al. | 379/345 |
| 4,600,811 | 7/1986 | Hayashi et al. | 379/345 |
| 4,809,297 | 2/1989 | Polansky | 375/7 |
| 4,972,457 | 11/1990 | O'Sullivan | 379/59 |

FOREIGN PATENT DOCUMENTS

| | | | |
|---|---|---|---|
| 61-177039 | 8/1986 | Japan . | |
| 61-199341 | 9/1986 | Japan . | |
| 64-073995 | 3/1989 | Japan . | |
| 2177572 | 1/1987 | United Kingdom | 379/59 |
| 2213686 | 8/1989 | United Kingdom | 379/58 |

*Primary Examiner*—Curtis Kuntz
*Assistant Examiner*—Vijay Shankar
*Attorney, Agent, or Firm*—David G. Conlin; Robert F. O'Connell

[57] ABSTRACT

A 2-wire/3-wire converting apparatus having two transmission/reception terminals to be connected to a 2-wire circuit, a transmission terminal, a reception terminal and a common terminal to be connected to a 3-wire circuit. The converting apparatus includes an electric circuit for applying between the two transmission/reception terminals a voltage proportional to a voltage of a reception signal conveyed on the 3-wire circuit and appearing between the reception terminal and the common terminal and for applying a voltage between the transmission terminal and the common terminal a voltage proportional to a voltage obtained by subtracting the voltage proportional to the voltage of the reception signal from a voltage appearing between the two transmission/reception terminals.

8 Claims, 5 Drawing Sheets

2-WIRE/3-WIRE CONVERTING APPARATUS

BACKGROUND OF THE INVENTION

1. Field of the Invention

The present invention relates to a 2-wire/3-wire converting apparatus which enables connection between a 2-wire interface provided in a data communication terminal etc. to be connected to a public telephone circuit and a 3-wire interface provided in an automobile telephone, a portable telephone, a cordless telephone etc.

2. Description of the Related Art

In a typical mobile communication system, as shown in FIG. 6, a mobile network control apparatus 4 is interposed for enabling connection between a mobile transceiver 2 for wireless communication with a telephone company 1 and a data communication terminal 3 such as a facsimile apparatus or a personal computer. The transceiver 2 is connected to the network control apparatus 4 through an interface 5 of the transceiver 2, an interface 6 of the network control apparatus 4, and a line 7. The interfaces 5 and 6 have 24 pins or 10 pins, respectively. The data communication terminal 3 is connected to the network control apparatus 4 through a 2-wire interface 8 of the terminal 3 for a public telephone circuit, a 2-wire interface 9 of the network control apparatus 4, and a line 10.

The foregoing system as shown in FIG. 6 entails provision of relatively large mobile network control apparatus 4, resulting in increasing the structure of the control apparatus 4 in size.

Another system is shown in FIG. 7. This system makes it possible to communicate a telephone company 1 with a portable telephone 11 or an automobile telephone by wireless. 12 denotes a 3-wire interface for connecting the handset of the portable telephone 11 to a data communication terminal 13. A 3-wire interface 12 is connected to a 3-wire interface 14 provided in the data communication terminal 13 through a line 15.

The data communication terminal 13 provided in the system shown in FIG. 7 includes the 3-wire interface 14 for connection with a 3-wire circuit which has three signal lines, one for transmission, one for reception, and one for common line. Hence, this data communication terminal 13 cannot be directly connected to the 2-wire telephone circuit having two bidirectional signal lines. This type of data communication terminal provided with a 3-wire interface is deemed to have a special specification in these days since a public telephone circuit modular specification based on the use of the 2-wire interface has been generalized. Hence, it is quite disadvantageous today to use such a data communication terminal provided with a 3-wire interface.

SUMMARY OF THE INVENTION

It is an object of the present invention to provide a 2-wire/3-wire converting apparatus which enables connecting a 2-wire interface corresponding to a widely available public telephone circuit to a 3-wire interface provided in an automobile telephone, a portable telephone, and a cordless telephone, for example.

In carrying out the object in a preferred mode, the present invention provides a 2-wire/3-wire converting apparatus which comprises:

two transmission/reception terminal to be connected to a 2-wire circuit;

a transmission terminal, a reception terminal and a common terminal to be connected to a 3-wire circuit; and means for applying between said two transmission/reception terminals a voltage proportional to a voltage of a reception signal conveyed on said 3-wire circuit and appearing between said reception terminal and said common terminal and for applying a voltage between said transmission terminal and said common terminal a voltage proportional to a voltage obtained by subtracting said voltage proportional to said voltage of said reception signal from a voltage appearing between said two transmission/reception terminals.

According to the invention, a communication apparatus, for example, an automobile telephone, a portable telephone, or a cordless telephone provided with a 3-wire interface is easily connected to a terminal such as a facsimile or a personal computer provided with a 2-wire interface.

Further objects and advantages of the present invention will be apparent from the following description, reference being had to the accompanying drawings wherein preferred embodiments of the present invention are clearly shown.

DESCRIPTION OF THE PREFERRED EMBODIMENTS

Figure 1:
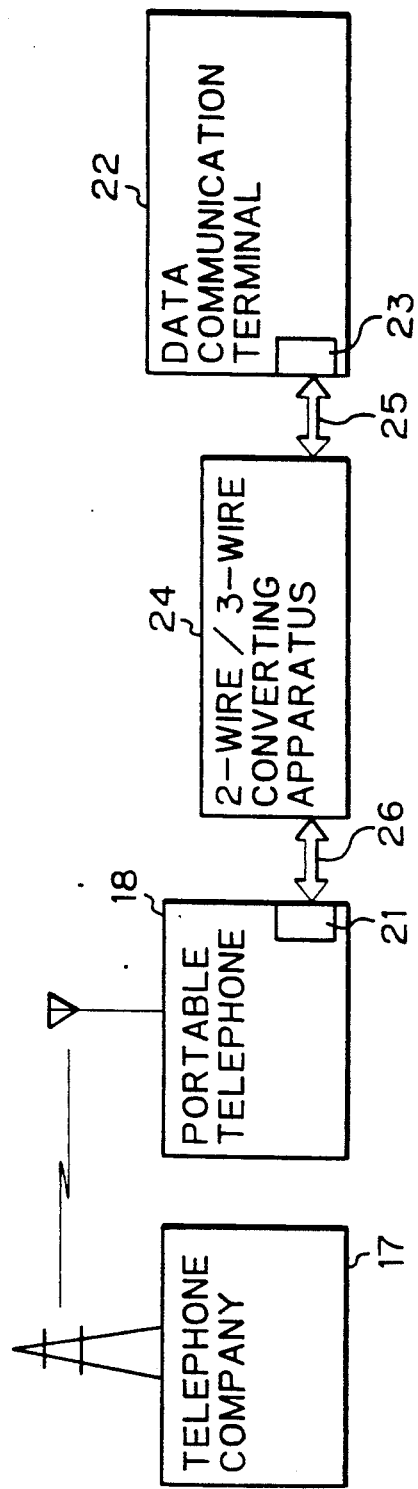
FIG. 1 is a block diagram of a wireless communication system having a 2-wire/3-wire converting apparatus according to a first embodiment of the present invention.

FIG. 1 is a block diagram of the first embodiment of the invention. A telephone company 17 communicates with a portable telephone 18 by wireless. The portable telephone 18 has a 3-wire interface 21.

22 denotes a data communication terminal such as a facsimile or a personal computer. The data communication terminal has a 2-wire interface 23 for enabling connection with a public telephone circuit. 24 denotes a 2-wire/3-wire converting apparatus according to the present invention. The 2-wire/3-wire converting apparatus 24 is connected to the interfaces 21 and 23 through lines 25 and 26 respectively so that signal transmission and reception are allowed between the data communication terminal 22 and the portable telephone 18.

Figure 2:
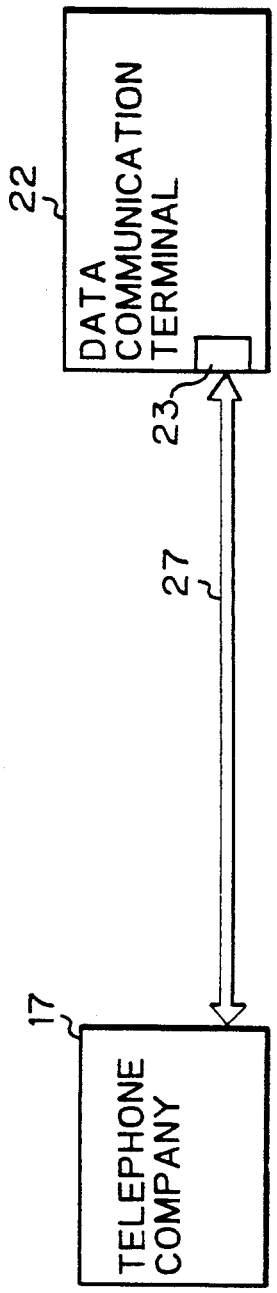
FIG. 2 is a view showing a connection between a data communication terminal shown in FIG. 1 and a telephone company without the 2-wire/3-wire converting apparatus.

FIG. 2 shows a connection between the data communication terminal 22 and the telephone company 17 without the 2-wire/3-wire converting apparatus 24. The 2-wire interface 23 of the data communication terminal 22 is connected to the telephone company 17 through a 2-wire public telephone line 27. As shown in FIG. 2, the data communication terminal 22 can be directly connected to the telephone company 17 through the line 27.

Figure 3:
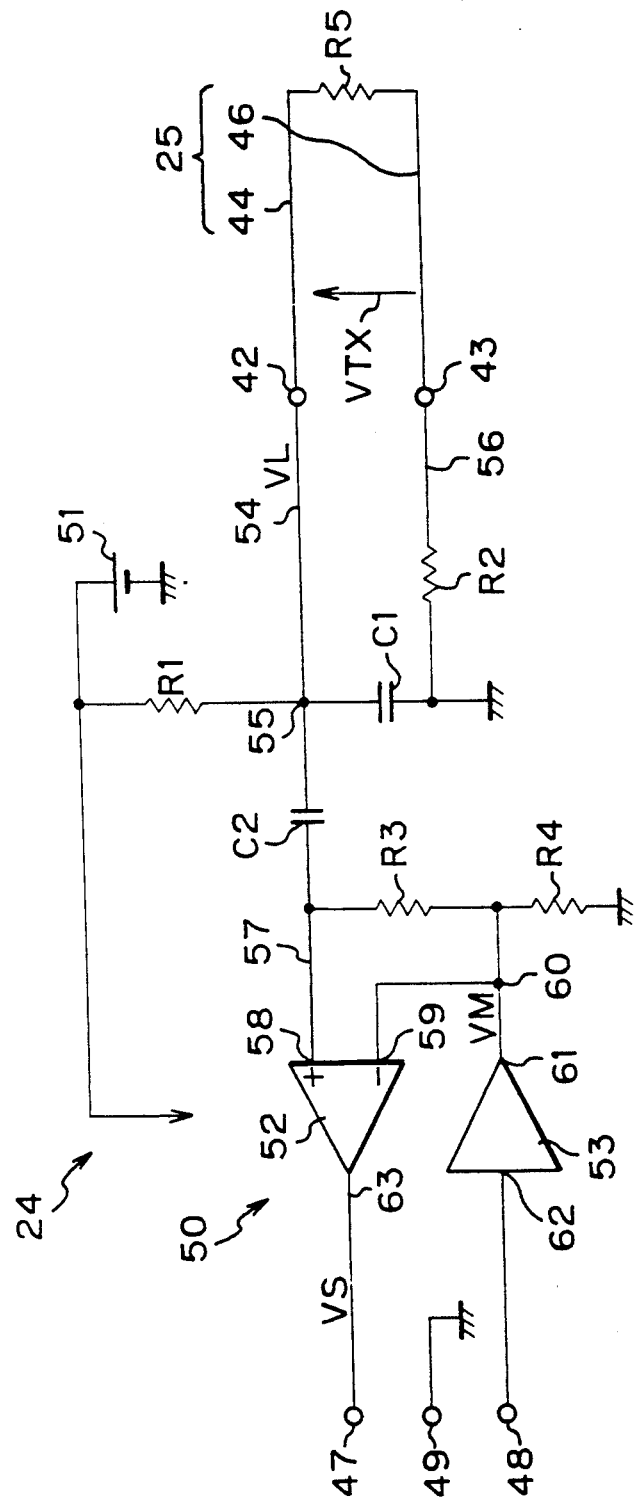
FIG. 3 is a circuit diagram of the 2-wire/3-wire converting apparatus shown in FIG. 1.

FIG. 3 is a circuit diagram of the 2-wire/3-wire converting apparatus 24. The 2-wire/3-wire converting apparatus 24 has the first and second transmission/reception terminals 42 and 43. These terminals 42 and 43 are connected to bidirectional lines 44 and 46 respectively generically shown by a reference numeral 25 in FIG. 1. This 2-wire/3-wire converting apparatus 24 has a transmission terminal 47, a reception terminal 48, and a common terminal 49. These terminals 47, 48, 49 are connected to the 3-wire interface 21 of the portable telephone 18. Between the terminals 42, 43 and the terminals 47, 48, 49 is interposed an electric circuit 50 for transmitting and receiving a signal therebetween. The three terminals of the 3-wire interface 21 are respectively connected to the terminals 47, 48, 49 of the 2-wire/3-wire converting apparatus 24 through a line 26.

The electric circuit 50 has a d.c. power source 51, which supplies an electric power to operational amplifiers 52, 53 and applies a voltage to a bias voltage supplying resistor R1. The transmission/reception terminal 42 is connected to a contact 55 of the resistor R1 through a line 54. Another transmission/reception terminal 43 is grounded through a line 56 and a public telephone circuit protecting resistor R2. A line stabilizing capacitor C1 is connected between the contact 55 and the resistor R2.

The contact 55 is connected to a positive input terminal 58 of the operational amplifier 52 having a gain of 2 and a high input impedance through a d.c. component blocking capacitor C2 and a line 57. A negative input terminal 59 of the operational amplifier 52 is connected at a contact 60 to an output terminal 61 of the other operational amplifier 53. An input terminal 62 of the operational amplifier 53 is connected to the reception terminal 48. This operational amplifier 53 has a gain of 1. A resistor R3 is connected between the line 57 and the contact 60. A resistor R4 is connected between the contact 60 and the ground. These resistors R3 and R4 serve to separate a transmission signal and a reception signal from each other. The operational amplifier 53 has a high input impedance. The operational amplifiers 52, 53 has low input impedances. An output terminal 63 of the operational amplifier 52 is connected to the common terminal 49.

The impedance of the 2-wire interface 23 of the data communication terminal 22 is shown by a reference R5 in FIG. 3. Herein, assume that the following relation is satisfied;

$$R2 + R5 = R3 \qquad (1)$$

In the above equation, R2 and R3 represent resistances of the resistors R2 and R3 respectively.

When VM denotes a voltage of a signal derived from the reception terminal 48 to the output terminal 61 of the operational amplifier 53 and VL denotes a voltage applied across the transmission/reception terminal 42 and the grounding level of at common terminal 49, and VTX denotes a signal sent from the data communication terminal 22, the following relation is established.

$$VL = VTX + 1/2 VM \qquad (2)$$

Assuming that VS is an output of the operational amplifier 52, since the voltage applied to the positive input terminal 58 of the operational amplifier 52 is VL and the voltage applied to the negative input terminal 59 is VM, the following relation is established.

$$\begin{aligned} VS &= 2VL - VM \\ &= (2VTX + VM) - VM \\ &= 2VTX \end{aligned} \qquad (3)$$

Hence, only a signal incoming from the public telephone circuit via the transmission/reception terminals 42, 43 appears between the output terminal 47 and the common terminal 49.

Figure 4:
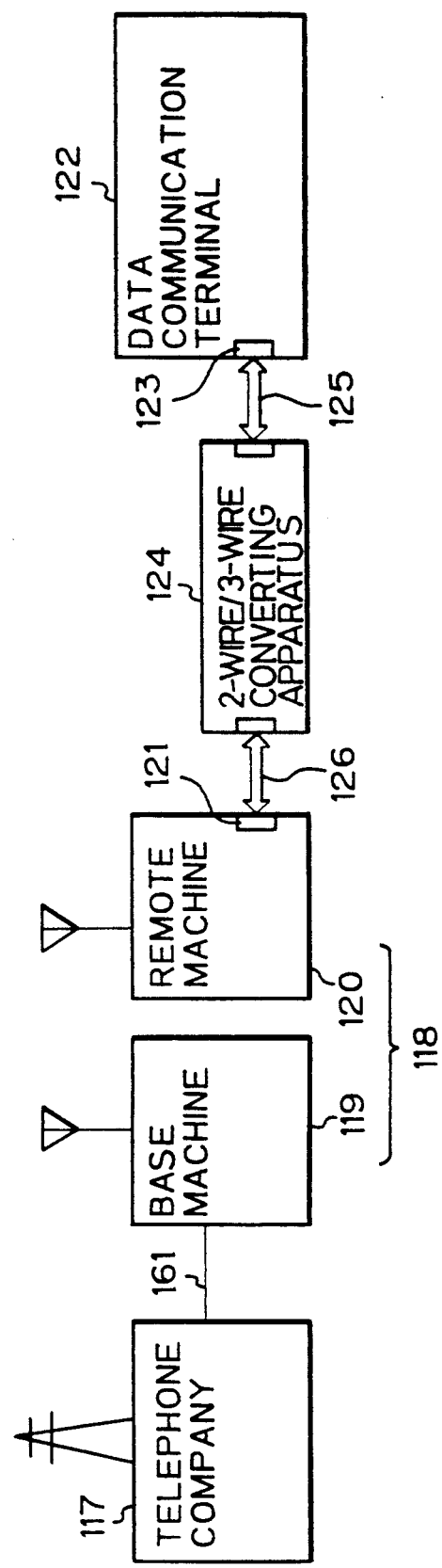
FIG. 4 is a block diagram of a second embodiment of the present invention.

FIG. 4 is a block diagram of a second embodiment of the present invention. 117 denotes a telephone company 117 which is connected to a base machine 119 of a cordless telephone 118 through a public telephone circuit 161. The base machine 119 is adapted to communicate with the remote machine 120 by wireless. The remote machine 120 has a 3-wire interface 121.

122 denotes a data communication terminal which is representatively a facsimile apparatus or a personal computer. The data communication terminal 122 has a 2-wire interface 123 for connection with the public telephone circuit. 124 denotes a 2-wire/3-wire converting apparatus which is the same as the 2-wire/3-wire converting apparatus 24 used in the foregoing first embodiment. The 2-wire/3-wire converting apparatus 124 is connected to the interfaces 123 and 121 through lines 125, 126, respectively so that signal transmission and reception is allowed between the data communication terminal 122 and the remote machine 120.

Figure 5:
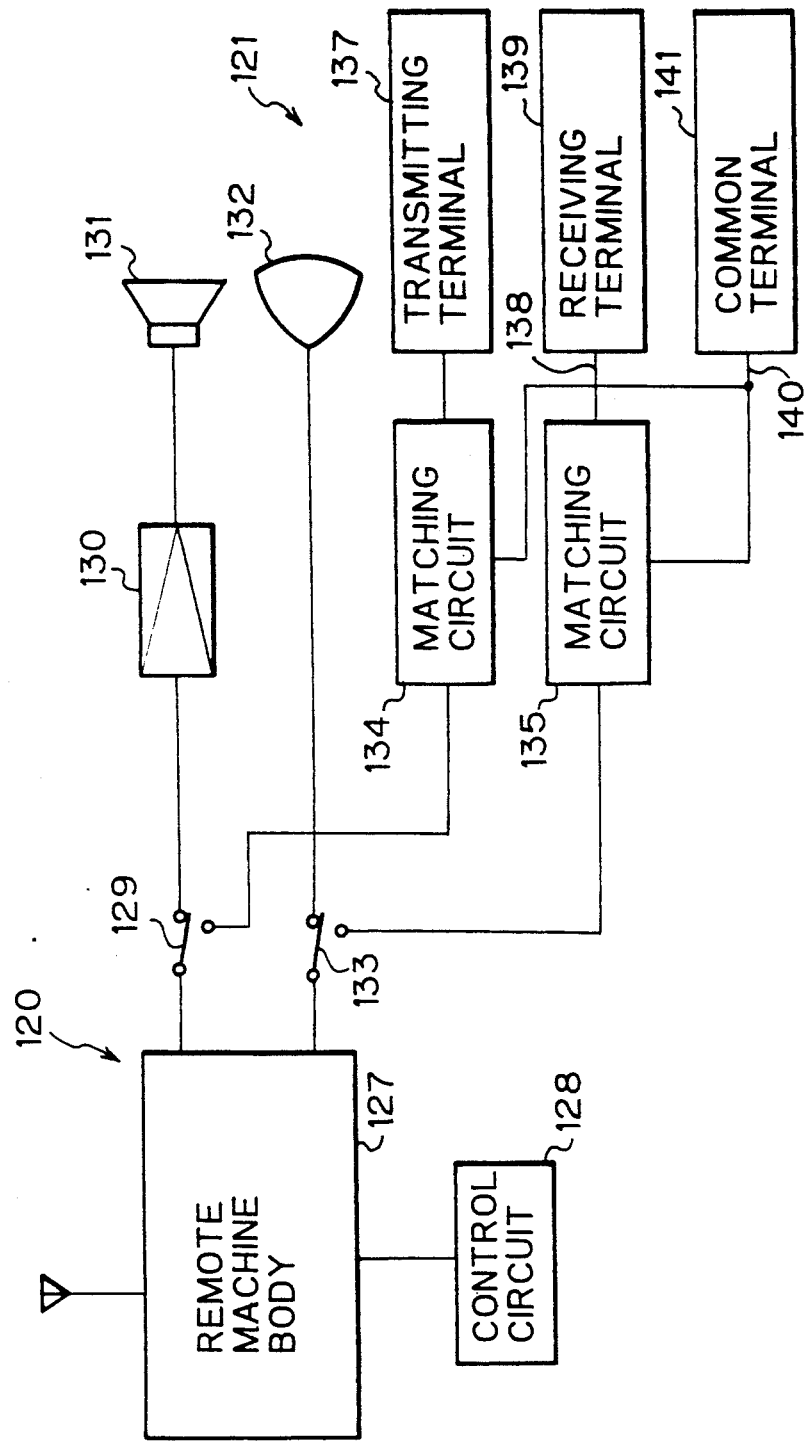
FIG. 5 is a block diagram of a remote machine of a cordless telephone shown in FIG. 4.
Figure 6:
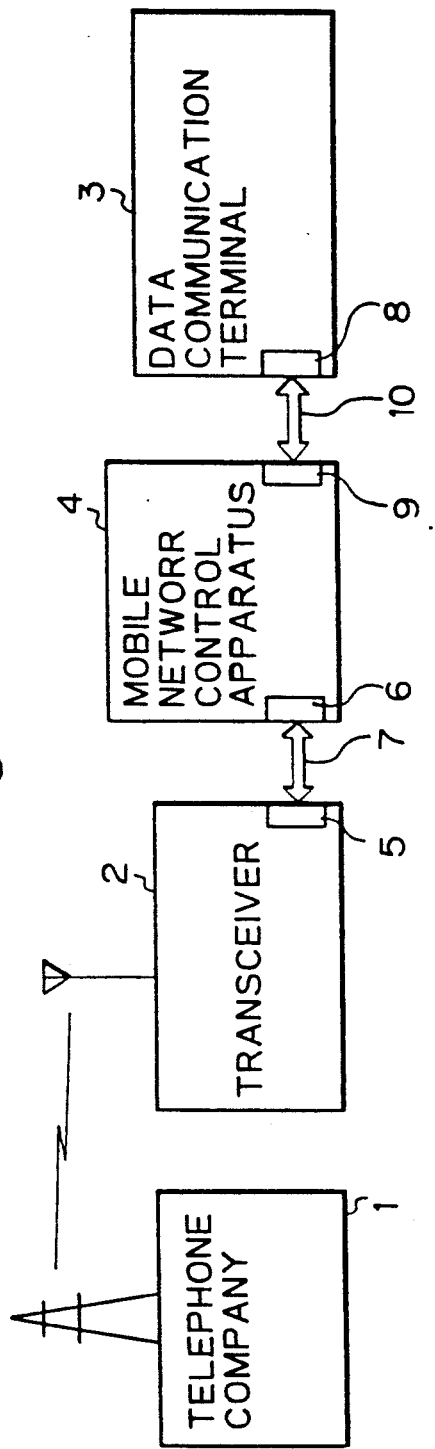
FIGS. 6 and 7 are block diagrams of typical mobile wireless communication systems.
Figure 7:
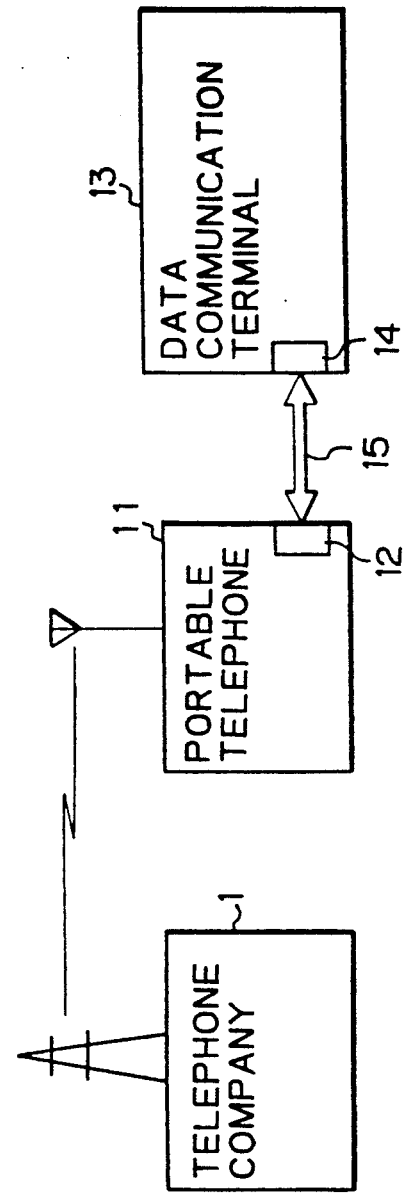

FIG. 5 is a block diagram of the remote machine 120. The remote machine 120 includes a main body 127. The main body 127 of the remote machine 120 can communicate with the base machine 119 under the control of a control circuit 128 by wireless. When the remote machine main body 127 receives an audio signal, it supplies the audio signal to an amplifier circuit 130 through a switch 129. The audio signal is amplified there and sounded out by a speaker 131. An audio signal inputted through a microphone 132 is supplied to the remote machine main body 127 through the switch 133 and further sent to the base machine 119 by wireless. The 3-wire interface 121 includes matching circuits 134, 135 connected to the switches 129, 133, respectively. Further, the interface 121 includes a transmission terminal 137 connected to a transmission line 136, a reception terminal 139 connected to a reception line 138, and a common terminal 141 connected to a common line 140.

Many widely different embodiments of the present invention may be constructed without departing from the spirit and scope of the present invention. It should be understood that the present invention is not limited to the specific embodiments described in this specification, except as defined in the appended claims.

What is claimed is:

1. A 2-wire/3-wire connecting circuit for connecting between a 2-wire circuit and a 3-wire circuit comprising:

two transmission/reception terminals to be connected to said 2-wire circuit;

a transmission terminal, a reception terminal and a common terminal to be connected to said; 3-wire circuit;

means connected between said reception terminal and one of said two transmission/reception terminals for setting between said one of said two transmission/reception terminals and said common terminal a first voltage represented by an addition of a voltage signal supplied from the 2-wire circuit and a second voltage proportional to a voltage reception signal conveyed on said 3-wire circuit:

means for subtracting said second voltage from said first voltage; and means for applying said subtracted voltage between said transmission terminal and said common terminal.

2. A communication system including a telephone having a 3-wire interface for connection with a 3-wire circuit, a data communication terminal having a 2-wire interface for connection with a 2-wire circuit, and a 2-wire/3-wire connecting circuit allowing connection between said telephone and said data communication terminal, wherein said 2-wire/3-wire connecting circuit comprises:

two transmission/reception terminals to be connected to said 2-wire circuit:

a transmission terminal, a reception terminal and a common terminal to be connected to said 3-wire circuit;

means connected between said reception terminal and one of said two transmission/reception terminals for setting between said one of said two transmission/reception terminals and said common terminal a first voltage represented by an addition of a voltage signal supplied from the 2-wire circuit and a second voltage proportional to a voltage reception signal conveyed on said 3-wire circuit;

means for subtracting said second voltage from said first voltage; and means for applying said subtracted voltage between said transmission terminal and said common terminal.

3. A communication system according to claim 2, wherein said telephone is an automobile telephone.

4. A communication system according to claim 3, wherein said data communication terminal is a facsimile apparatus or a personal computer.

5. A communication system according to claim 2, wherein said telephone is a portable telephone.

6. A communication system according to claim 5, wherein said data communication terminal is a facsimile apparatus or a personal computer.

7. A communication system according to claim 2, wherein said telephone is a cordless telephone.

8. A communication system according to claim 7, wherein said data communication terminal is a facsimile apparatus or a personal computer.

* * * * *